June 11, 1929.   C. W. WEISENFELS   1,716,473

STOVE CONSTRUCTION

Filed Sept. 14, 1927

INVENTOR
C. W. WEISENFELS
BY
ATTORNEY

Patented June 11, 1929.

1,716,473

UNITED STATES PATENT OFFICE.

CHARLES W. WEISENFELS, OF ST. LOUIS, MISSOURI, ASSIGNOR TO AMERICAN THERMOMETER COMPANY, OF ST. LOUIS, MISSOURI, A CORPORATION OF MISSOURI.

STOVE CONSTRUCTION.

Application filed September 14, 1927. Serial No. 219,426.

My invention relates to a stove construction and particularly to means for securing a thermometer to the panel of a stove door. Heretofore it has been customary to fasten the back of the thermometer casing to the oven lining back of the door, the front end of the casing being allowed to project a slight distance through the opening in the panel. This construction is subject to the objections that the instruments must be attached to the lining prior to securing the lining to the door; that with this method of manufacture the instruments projected varying distances beyond the front face of the panel, and in cases where the lining warped under heat, the instruments were frequently carried inwardly out of the panel opening. The object of my invention is to overcome these difficulties and to provide a construction preventing the shifting of the instrument inwardly by warping of the lining in use, and one in which the joint between the instrument casing and the panel will be concealed by a flange on the casing whereby the construction will not only be permanent and easily assembled, but will also present an attractive exterior appearance.

Figure 1:
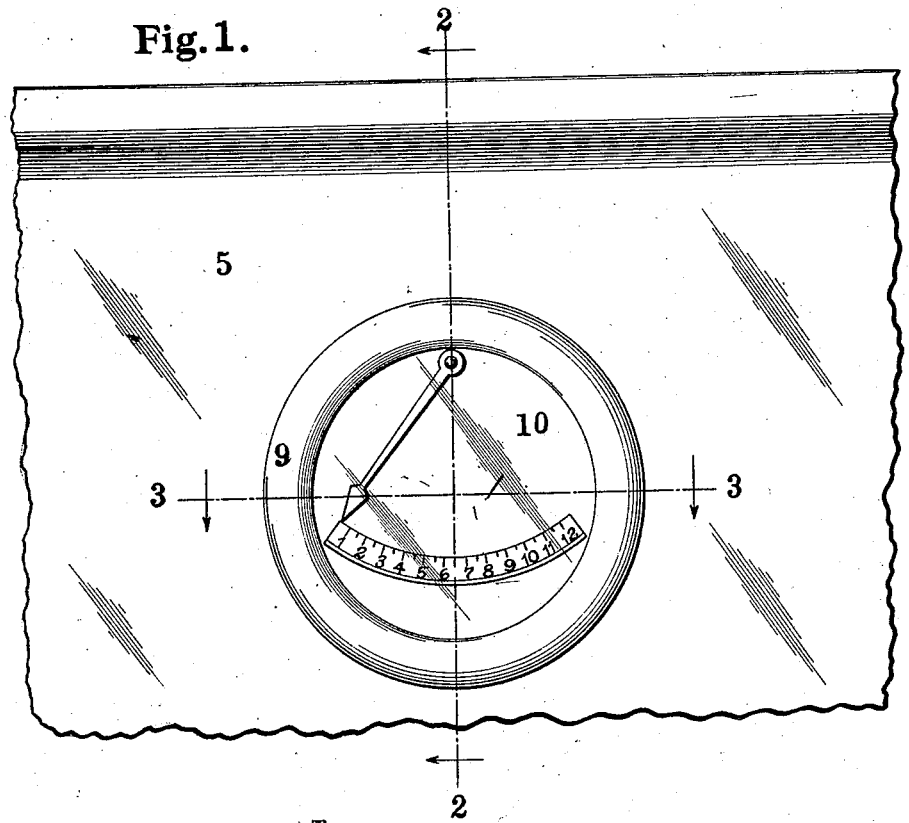
Figure 2:
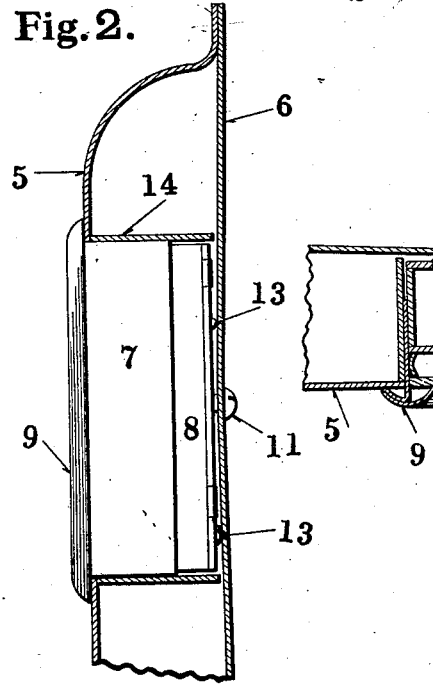
Figure 3:
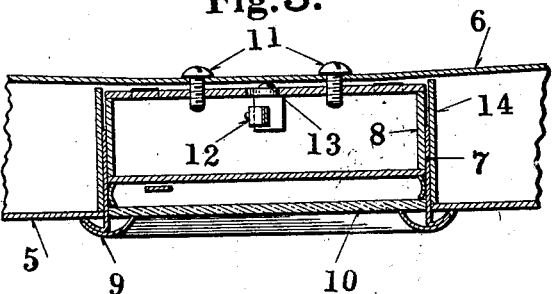

In the accompanying drawings, which illustrate one form of construction embodying my invention, Figure 1 is a front view of a stove thermometer and a portion of the door to which it is applied; Figure 2 is a section along the line 2—2 of Figure 1, the thermometer casing being in elevation; and Figure 3 is a sectional view of the casing and associated parts along the line 3—3 of Figure 1.

The stove door panel, indicated at 5, is provided with a lining sheet 6 secured thereto in any usual manner and spaced therefrom. The thermometer casing comprises an outer part 7 and an inner part 8 suitably secured together, and is adapted to project through an opening in the panel. A duplex flange 9 is formed on the front part of the casing, the outer part of the flange being adapted to bear on the front face of the panel, and the inner part to retain the instrument cover glass 10. The rear of the inner part of the casing is provided with tapped openings to receive the retaining screws 11 by means of which it is secured to the lining. The indicator of the thermometer is operated by a thermostatic element which, in the form shown, comprises a bar of thermostatic metal 12 mounted on the rear part of the casing by means of a brass rivet 13.

In constructions of the kind described, it is important that there be heat conducting contact between the liner and the operative element of the thermometer in order that there may be a fairly uniform relation in all installations between the temperature in the stove oven and the temperature applied to the actuating element of the thermometer, otherwise with uniform dials the temperature indications might vary widely in a particular installation from the actual oven temperature. I therefore so proportion the depth of the instrument casing to the space between the liner and the panel that the liner may always be drawn against portions of the back of the casing, such for example, as the head of the rivet on which the thermostatic element is mounted. I also preferably make these relations such that in drawing the lining into this relation with the casing it is slightly bent, whereby its resilience serves to hold the flange 9 of the casing firmly against the front face of the panel.

It will be noted that in the construction described, warping of the liner under heat cannot withdraw the instrument through the panel and, although in view of the fact that the liner is strained in the direction of the panel in mounting the instrument, the effects of heat are not so likely to cause it to move further in that direction and thus move the instrument flange out of contact with the front face of the panel, I prefer to prevent the possibility of this by applying a spacing ring 14 around the instrument casing after it has been passed through the panel, thereby limiting the amount of forward movement of the casing with reference to the panel.

Having fully described my invention, what I claim as new and desire to secure by Letters Patent of the United States is:

1. In a stove construction, the combination of an outer panel, a stove lining sheet spaced therefrom, an instrument casing extending through the panel and provided with a flange adapted to bear on the front face thereof, and means for securing the instrument casing to the lining sheet, said means being also adapted to draw the aforesaid flange against the panel.

2. In a stove construction, the combination of an outer panel, a stove lining sheet spaced therefrom, an instrument casing extending through the panel and provided with retaining means adapted to engage the front face thereof, and means adapted to secure the instrument casing in heat conducting contact with the lining and the retaining means on the casing in close relation with the front face of the panel.

3. In a stove construction, the combination of an outer panel, a stove lining sheet of material having resilience and spaced from the panel, an instrument casing extending through the panel and provided with retaining means adapted to bear on the front face thereof, and means for securing the instrument casing to the lining sheet, the relation of the lining to the instrument casing being such as to permit the lining sheet to be flexed by drawing up the casing securing means whereby the resilience of the lining tends to hold the retaining means on the front of the casing against the panel.

4. In a stove construction, the combination of an outer panel, a stove lining sheet spaced therefrom, an instrument casing extending through the panel and provided with retaining means adapted to engage the front face thereof, means for securing the instrument casing to the lining sheet, and spacing means between the lining and the panel to limit the movement of the former toward the latter.

5. In a stove construction, the combination of an outer panel, a stove lining sheet spaced therefrom, an instrument casing extending through the panel and provided with retaining means adapted to contact with the panel to prevent motion of the casing therethrough in one direction, and means for securing the instrument casing to the lining sheet.

In testimony whereof, I hereunto affix my signature, this 10th day of September, 1927.

CHARLES W. WEISENFELS.